US005895107A

United States Patent [19]
Haslam

[11] Patent Number: 5,895,107
[45] Date of Patent: Apr. 20, 1999

[54] PROMOTION OF C2 STATE IN FERROELECTRIC LIQUID CRYSTAL DEVICES

[75] Inventor: Simon David Haslam, Monmouth, United Kingdom

[73] Assignees: Sharp Kabushiki Kaisha, Osaka, Japan; The Secretary of State for Defence in Her Britannic Majesty's Government of the United Kingdom of Great Britain and Northern Ireland, Hants, United Kingdom

[21] Appl. No.: 08/867,168

[22] Filed: Jun. 2, 1997

[30] Foreign Application Priority Data

Jun. 11, 1996 [GB] United Kingdom ............... 9612168

[51] Int. Cl.⁶ ............................................. G02F 1/13
[52] U.S. Cl. ........................................ 349/172; 349/188
[58] Field of Search .............................. 349/172, 188, 349/184

[56] References Cited

FOREIGN PATENT DOCUMENTS 5-34696   2/1993   Japan .

Primary Examiner—William L. Sikes
Assistant Examiner—James Dudek

[57] ABSTRACT

In order to promote the formation of the C2 state during manufacturing of a ferroelectric liquid crystal display comprising a cell including a layer of chiral smectic ferroelectric liquid crystal material contained between two substrates. The manufacturing method includes the steps of (a) heating the liquid crystal material and (b) whilst allowing the liquid crystal material to cool from an elevated temperature, which is close to the phase transition temperature to the chiral smectic phase, allowing pressure to the liquid crystal material within the cell by means of rollers in such a manner as to produce mass flow of liquid crystal material within the cell so that the liquid crystal material preferentially adopts the C2 state on cooling to the device operating temperature. This avoids formation of both the C1 and C2 states in the manufactured display which would otherwise result in a patchy appearance, and allows faster switching at lower voltages.

11 Claims, 2 Drawing Sheets

PROMOTION OF C2 STATE IN FERROELECTRIC LIQUID CRYSTAL DEVICES

This invention relates to methods of promoting the C2 state in ferroelectric liquid crystal devices.

BACKGROUND OF THE INVENTION

Liquid crystal devices incorporating a ferroelectric smectic liquid crystal material (FLCDs) are particularly suitable for use in displays and shutters in which their fast switching times and memory characteristics are of advantage. A conventional FLCD cell comprises a layer of ferroelectric smectic liquid crystal material contained between two parallel glass substrates, electrode structures being typically provided on the inside facing surfaces of the glass substrates in the form of row and column electrode tracks which cross one another to form an addressable matrix array. Prior to assembly of the substrates and filling of the cell with liquid crystal material, the inner surface of one or both substrates is treated to impart a preferred surface alignment direction and preferably a surface pretilt to the contacting molecules of the liquid crystal material layer.

The switching behavior of the liquid crystal molecules is dependent on the arrangement of the molecules in microlayers which, in the case of chiral smectic material, extend transversely of the substrates and adopt a chevron geometry having two possible states, C1 and C2, ad disclosed in J Kambe et al, Ferroelectric (1991), vol. 114, pp 3. Both C1 and C2 states can form as the material cools down from an isotropic phase to the chiral smectic phase during manufacture, and the boundaries between these two states may be seen as a zigzag defect. When used in a display device, material incorporating both the C1 and the C2 states can appear patchy, and it is therefore preferred that the material should be in one state for a practical device. The C2 state is preferred as it allows faster switching at lower voltages.

FLCD's are typically produced by assembling together the two glass substrates after they have been provided with the required electrode structures and appropriate surface treatment, typically involving spinning on a thin polymer alignment layer which is then rubbed to impart a preferred surface alignment direction, spacers being provided to space the two substrates apart by a small amount, typically in the range of 0.5 μm to 50 μm. The cell may then be filled by placing it above a bath of liquid crystal material, which is heated to a temperature at which it is in the isotropic phase, so that the bottom edges of the substrates are in contact with the material within the bath, and by then applying a vacuum so as to slowly draw the liquid crystal material upwardly between the substrates by capillary action. Alternatively the cell may be filled by injection of the liquid crystal material between the substrates. After filling of the cell, which may take a number of hours, the heat is removed and the cell is cooled down very slowly so that the liquid crystal material passes from the isotropic phase through the cholesteric and smectic A phases to the chiral smectic phase (usually the chiral smectic C phase) as the material cools (one or more of these phases may be omitted in certain materials). It is known to impart a pretilt by means of the alignment layer which favours the C2 state on cooling of the material. High values of pretilt tend to favour the C1 state, whereas low or medium values of pretilt tend to favour the C2 state. The relevant criteria are described in more detail in J C Jones, M J Towler, J R Hughes. "Fast, high-contrast ferroelectric liquid crystal displays and the role of dielectric biaxially". Displays (1993). vol. 14, no. 2, pp 86. However it can be difficult to obtain large areas of the C2 state in certain materials.

SUMMARY OF THE INVENTION

It is an object of the invention to provide a method of promoting the C2 state in a ferroelectric liquid crystal device during manufacture.

According to the present invention there is provided a method of promoting the C2 state in a ferroelectric liquid crystal device which comprises a cell including a layer of chiral smectic ferroelectric liquid crystal material contained between two substrates, the method including the steps of:

(a) heating the liquid crystal material; and (b) whilt allowing the liquid crystal material to cool from an elevated temperature, which is close to the phase transition temperature to the chiral smectic phase, applying pressure to the liquid crystal material within the cell in such a manner as to produce mass flow of liquid crystal material within the cell so that the liquid crystal material preferentially adopts the C2 state of cooling to the device operating temperature.

Such pressure induced mass flow of material within the cell can provide sufficient energy to enable growth of the large areas of material in the C2 state using materials for which production of such large areas of material in the C2 state has not previously proved possible. The method may be carried out as part of the cooling step during the normal manufacturing process in which the material is cooled down from the isotropic phase to the chiral smectic phase, or alternatively the method may be effected as a series of additional steps after the normal manufacturing process has been completed, involving heating of the cell to a temperature slightly below the chiral smectic phase transition temperature, and the application of pressure to the cell during cooling down to the operating temperature.

BRIEF DESCRIPTION OF THE DRAWINGS

In order that the invention may be more fully understood, a preferred method in accordance with the invention will now be described, by way of example, with reference to the accompanying drawings, in which.

DETAILED DESCRIPTION OF THE DRAWINGS

Figure 1:
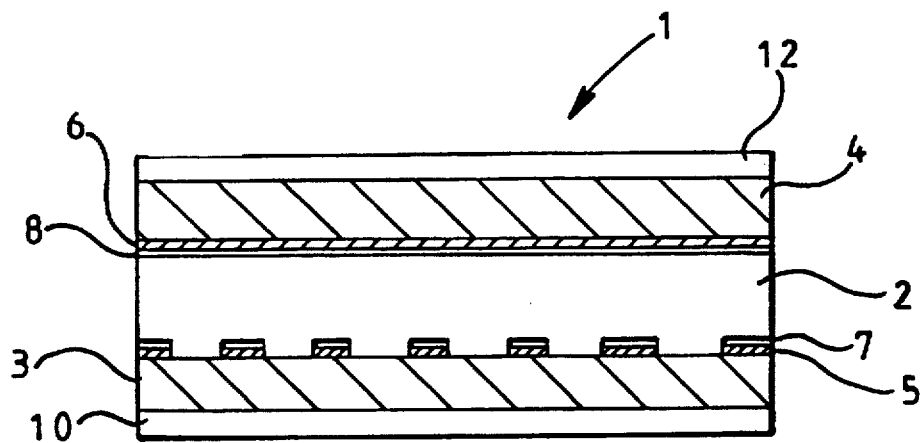
FIG. 1 diagrammatically shows a section through a FLCD cell.

FIG. 1 shows a typical structure of a FLCD cell 1 in which a ferroelectric liquid crystal material 2 in the chiral smectic phase is contained between two glass substrates 3 and 4 spaced apart by spacers (not shown) so as to extend parallel to one another and sealed at their edges. Transparent ITO (indium tin oxide) electrode structures 5 and 6 are applied to the inwardly directed faces of the substrates 3 and 4. Each of the electrode structures 5 and 6 is in the form of electrode tracks arranged parallel to one another, the tracks of the structure 5 being arranged in rows and the tracks of the structure 6 being arranged in columns extending perpendicularly to the rows so as to enable pixels at the intersections of the rows and columns to be addressed by the application of suitable strobe and data pulses to the appropriate intersecting tracks of the two electrode structures 5, 6.

A thin polymer alignment layer 7, 8, for example a polyamide alignment layer, is applied to the inwardly directed face of each electrode structure 5, 6, each alignment layer being treated to provide a pretilt angle $\xi$ of 2° to 10° to the surface, for example, and being rubbed in a required rubbing direction by buffing with a soft cloth made of rayon, for example, in order to impart a preferred alignment to the molecules of the liquid crystal material 2 in the vicinity of the alignment layers 7, 8. The rubbing directions of the two layers 7, 8 are typically parallel and in the same direction. Liquid crystal material is aligned during manufacture by cooling through the higher temperature phases to the required chiral smectic phase. As is well known the molecules, when in the chiral tilted smectic phase, are uniformly aligned in microlayers extending perpendicularly to the glass substrates 3, 4, the molecules in each microlayer adopting a chevron geometry due to the alignment of the molecules with the substrates 3, 4 on both sides of the liquid crystal layer, and preferentially being aligned in the C2 state as referred to above, rather than in the C1 state.

Figure 2:
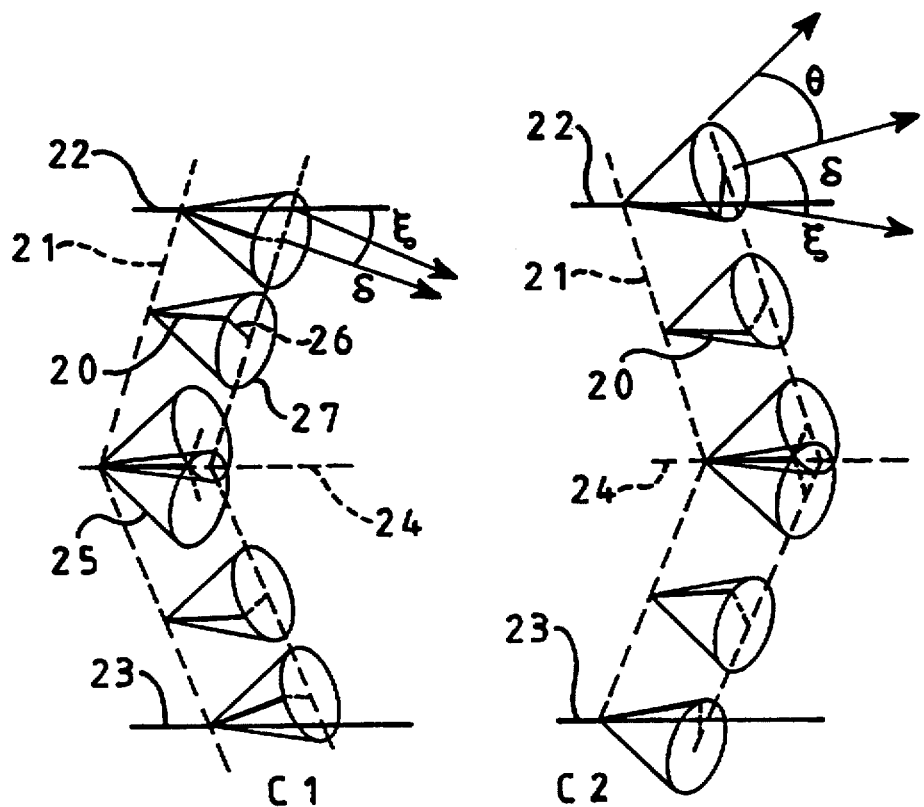
FIG. 2 is an explanatory digram illustrating the two chevron states of the material used in the FLCD cell.

The C1 and C2 states are shown diagrammatically in FIG. 2 with the molecules 20 being shown in each case aligned in a microlayer 21 between the inner surfaces 22 and 23 of the cell substrates in the appropriate one or the two chevron states, which differ in the angles made at the chevron interface 24 midway between the surfaces 22 and 23. In this diagram the molecules 20 in each microlayer 21 are shown as if each molecular axis is on the surface of a cone 25 with the director 26 of each molecule being orientated at an appropriate angle in the plane of the base 27 of the cone 25. Strong aligning forces anchor the molecules 20 in a tilted and aligned direction adjacent to each of the substrate surfaces 22 and 23, whereas the molecules 20 away from the substrate surfaces tend to arrange themselves in one of two stable positions on the surface of the cone 25. When a small d.c. electric field of appropriate polarity, amplitude and time is applied across the cell during switching by the data and strobe pulses, the molecules 20 rotate from one stable position on the surface of the cone 25 to the other stable position. The angle of the cone 25 around which each molecule 20 rotates is the cone angle $\theta$, the angle between the surface 22 or 23 and the microlayer 21 is $\delta$, and the surface tilt or pretilt angle of the molecule at the surface 22 or 23 is $\xi$. The energy required by the molecules to adopt a particular arrangement depends upon the liquid crystal used and the surface treatment applied to the substrates.

Figure 3:
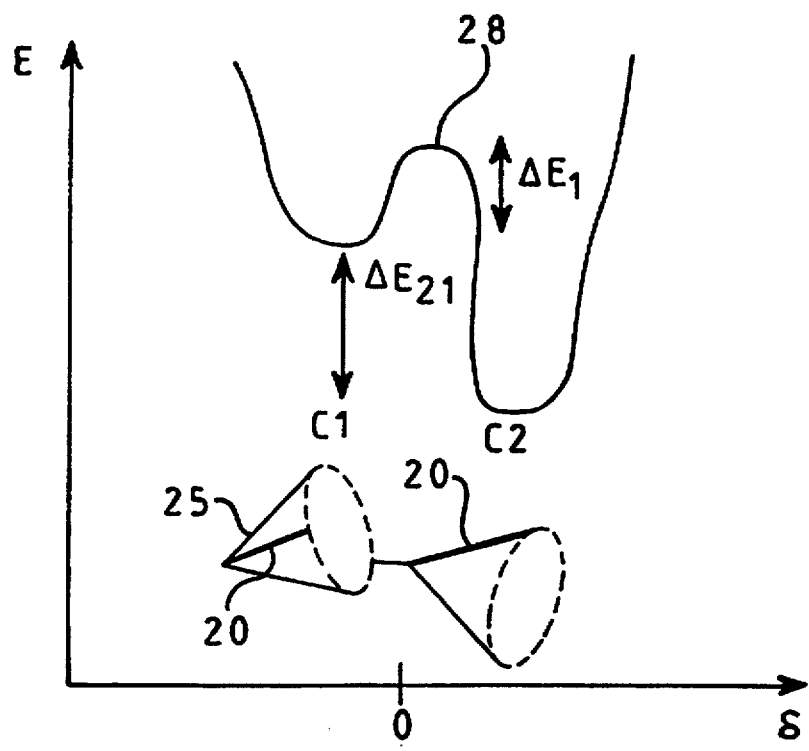
FIG. 3 is a graph of energy against microlayer tilt indicating the two chevron states.

FIG. 3 is a plot of energy E against microlayer angle $\delta$ for a cell where the liquid crystal material and surface treatment are chosen such that the energy level for the state C2 is lower than for the state C1. In this case, when the cell is filled with the liquid crystal material and cooled during manufacture, the molecules will favour the C2 state over the C1 state on cooling. Furthermore, in a preferred method in accordance with the invention as described below, a step is incorporated in the manufacturing process in which pressure is applied to at least one of the substrates during cooling from a temperature close to the chiral smectic phase transition temperature so as to cause mass flow of the liquid crystal material within the cell generally along the alignment direction of the surfaces 22 and 23 in order to tend to cause molecules orientated in microlayers in the C1 state to reorientate themselves in microlayers in the C2 state. This corresponds to an energy input sufficient to enable molecules to surmount the energy barrier 28 in passing from the C1 state to the C2 state, as shown in the plot of FIG. 3. Ideally the C2 state should form spontaneously on cooling at some temperature well above the desired operating range of the cell and close to the chiral smectic phase transition temperature, for example within 5° of this temperature. At this phase transition the material is more mobile and can change from the C1 state to the C2 state more readily than at lower temperatures.

Figure 4:
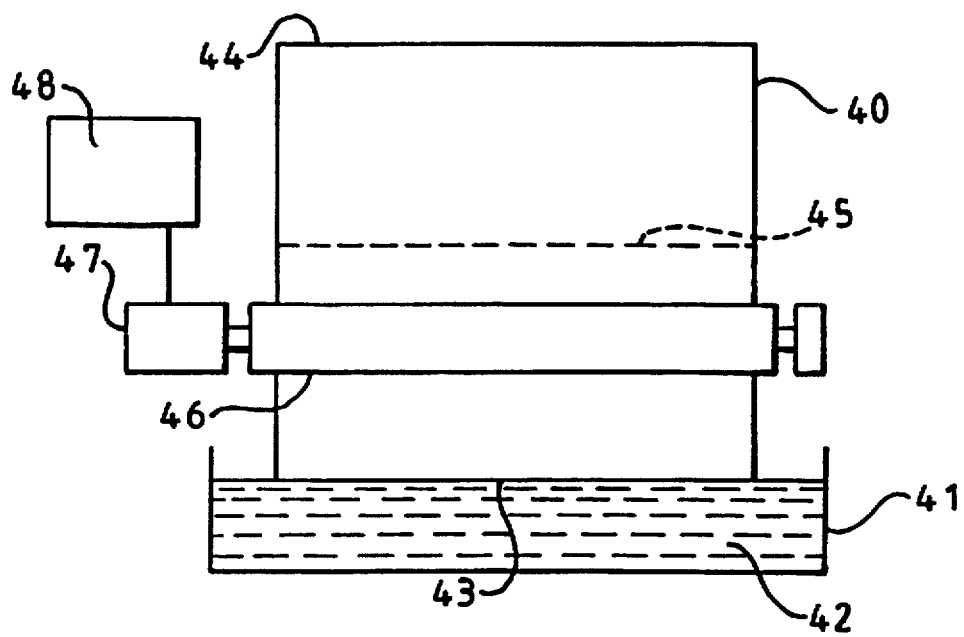
FIG. 4 is a diagram illustrating the preferred method in accordance with the invention.

The preferred manufacturing method of the cell will now be described with reference to FIG. 4. As in a conventional FLCD manufacturing process, the two glass substrates, to which the required electrode structures and appropriate surface treatments have previously been applied, are assembled together, being spaced apart by a uniform small distance by means of spaces integral with one or both of the substrates, and the two sides edges are sealed. The resulting cell 40 is then filled by placing it above a bath 41 of liquid crystal material 42, which is heated to a temperature at which it is in the isotrophic phase, so that the bottom edges 43 of the substrates are in contact with the material 42 within the bath 41. A vacuum is then applied to the opening between the top edges 44 of the substrates so as to slowly draw the liquid crystal material 42 upwardly between the substrates by capillary action, as indicated by the broken line 45 in FIG. 4 representing the rising level of the material within the cell. The filing typically takes 12 hours or more to complete for a large cell. Alternatively the liquid crystal material is introduced between the substrates by a known injection filling process.

After filling of the cell, the cell is cooled at a slow rate, for example at a rate of 1° C. per minute down to the chiral smectic phase transmission temperature. Thereafter a pressure application 26, in the form of two parallel rollers in contact with opposing parts of the outer surfaces of two substrates of the cell, is activated by an electric motor 47 under the control of a control unit 48 in order to apply pressure to the two substrates during simultaneous slow rotation of the rollers by the motor 47 accompanied by downward movement of the applicator 46. In this way the pressure applicator 46 applied pressure to the cell 40 along a line which progressively moves downwardly, preferably from top to bottom of the cell, so that the liquid crystal material within the cell is caused to flow at a temperature close to the phase transition temperature and the formation of the C2 state is thereby promoted during cooling of the material. After completion of the pass by the pressure applicator 46, the cell is allowed to cool down to the operating temperature, and the top and bottom edges of the cell are sealed in conventional manner.

Such a method of cell production enables efficient growth of the C2 state even in cells in which the growth of large areas of C2 state material would otherwise be difficult. This allows use of liquid crystal materials and surface alignment treatments which give good performance such as fast switching and good contrast, but which would otherwise not readily enable formation of large areas of C2 state material. Significant amounts of pressure can be applied without ruining alignment quality. In a particular example, it was found that the application of pressure to a 1.5 µm parallel-rubbed JALS-214 polymer cell filled with SCES liquid crystal material during cooling promoted extensive growth of the C2 state.

It is believed that two mechanisms may be responsible for promotion of the C2 state on application of pressure to deform the cell and cause the liquid crystal material between the substrates to flow. In the first mechanism sufficient energy is provided to the liquid crystal material to overcome pinning of the defect which has caused C2 growth to be slow or inhibited. In the second mechanism the cell deformation causes an effective increase in surface pretilt which again promotes C2 growth. One of these mechanisms may predominate under certain circumstances, or both mechanisms may combine to provide the required C2 growth promotion.

It is also possible for the amount of C2 state material in a sealed cell, which has previously been filled and cooled down to its operating temperature in conventional manner, to be increased by first heating the cell to a temperature close to the chiral smectic phase transition temperature, and by then applying pressure to the cell during cooling in a manner similar to that described above with reference to FIG. 4. Furthermore a similar pressure application step may be incorporated in a method for producing a FLCD cell by laminating the liquid crystal material between two sheets of plastics material. In this case the liquid crystal material may be simultaneously laminated between the sheets of plastics material and have the required pressure applied thereto by passing the liquid crystal material and the two sheets of plastics material between two rotating rollers.

We claim:

1. A method of promoting the C2 state in a ferroelectric liquid crystal device which comprises a cell including a layer of chiral smectic ferroelectric liquid crystal material contained between two substrates, the method including the steps of:

(a) heating the liquid crystal material, and (b) whilst allowing the liquid crystal material to cool from an elevated temperature, which is close to the phase transition temperature to the chiral smectic phase, applying pressure to the liquid crystal material within the cell in such a manner as to produce mass flow of liquid crystal material within the cell so that the liquid crystal material preferentially adopts the C2 state on cooling to the device operating temperature.

2. A method according to claim 1, wherein the liquid crystal material is heated in step (a) prior to being introduced between the substrates, and pressure is applied to the liquid crystal material in step (b) by the application of pressure to at least one of the substrates.

3. A method according to claim 2, wherein pressure is applied to the liquid crystal material in step (b) by the application of pressure to said at lease one substrate after the liquid crystal material has been introduced between the substrates.

4. A method according to claim 3, wherein pressure is applied to the liquid crystal material in step (b) progressively from one end of the cell to the other after the liquid crystal material has been introduced between the substrates by capillary action.

5. A method according to claim 1, wherein, immediately prior to step (b), the liquid crystal material is heated to a phase above the chiral smectic phase and the liquid crystal material is cooled to around the phase transmission temperature to the chiral smectic phase.

6. A method according to claim 1, wherein the liquid crystal material is heated in step (a) while the liquid crystal material is sealed between the two substrates and is in the chiral smectic phase.

7. A method according to claim 1, wherein pressure is applied to the liquid crystal material in step (b) by relative movement between a pressure roller or bar acting on at least one of the substrates and said at least one substrate.

8. A method according to claim 7, wherein pressure is applied to the liquid crystal material in step (b) by two pressure rollers or bars acting in opposition to one another on opposing parts of the two substrates and by relative movement between the pressure rollers or bars and the two substrates of the cell.

9. A method according to claim 1, wherein the inner surface of at least one of the substrates is treated to impart a preferred surface alignment direction to the adjacent molecules of the liquid crystal material, and wherein the pressure applied to the liquid crystal material in step (b) produces mass flow of liquid crystal material generally along said alignment direction.

10. A method according to claim 1, wherein the inner surface of at least one of the substrates is treated to impart a surface pretilt, and wherein the liquid crystal material and surface pretilt are selected to provide an energy difference at the surface for molecules of the liquid crystal material in the C1 and C2 states such as to favour the C2 state of the liquid crystal material during cooling from a temperature above the chiral smectic phase transition temperature to the device operating temperature.

11. A method according to claim 1, wherein a varying voltage is applied to the liquid crystal material during cooling from a temperature above the chiral smectic phase transition temperature to a temperature below the chiral smectic phase transition temperature so as to promote formation of the C2 state.

* * * * *